(12) United States Patent
Bai et al.

(10) Patent No.: US 7,524,575 B2
(45) Date of Patent: Apr. 28, 2009

(54) FLOW FIELD PLATE FOR USE IN FUEL CELLS

(75) Inventors: Dingrong Bai, Dorval (CA); Jean-Guy Chouinard, Ville St-Laurent (CA); David Elkaïm, Ville St-Laurent (CA)

(73) Assignee: Hyteon Inc., Laval, Québec (CA)

( * ) Notice: Subject to any disclaimer, the term of this patent is extended or adjusted under 35 U.S.C. 154(b) by 744 days.

(21) Appl. No.: 10/861,409

(22) Filed: Jun. 7, 2004

(65) Prior Publication Data

US 2005/0271909 A1    Dec. 8, 2005

(51) Int. Cl.
  *H01M 2/14*  (2006.01)
  *H01M 2/00*  (2006.01)
  *H01M 2/02*  (2006.01)
(52) U.S. Cl. .............................. 429/39; 429/34; 429/38
(58) Field of Classification Search .................. 429/39, 429/34, 38
  See application file for complete search history.

(56) References Cited

U.S. PATENT DOCUMENTS

| | | | |
|---|---|---|---|
| 3,881,956 A | 5/1975 | Williams et al. |
| 4,310,605 A | 1/1982 | Early et al. |
| 4,732,822 A | 3/1988 | Wright et al. |
| 4,769,297 A | 9/1988 | Reiser et al. |
| 4,826,742 A | 5/1989 | Reiser |
| 4,933,242 A | 6/1990 | Koga et al. |
| 4,988,583 A | 1/1991 | Watkins et al. |
| 5,108,849 A | 4/1992 | Watkins et al. |
| 5,300,370 A | 4/1994 | Washington et al. |
| 5,382,478 A | 1/1995 | Chow et al. |
| 5,478,662 A | 12/1995 | Strasser |
| 5,521,018 A | 5/1996 | Wilkinson et al. |
| 5,527,363 A | 6/1996 | Wilkinson et al. |
| 5,547,777 A | 8/1996 | Richards |
| 5,686,199 A | 11/1997 | Cavalca et al. |
| 5,840,438 A | 11/1998 | Johnson |
| RE36,148 E | 3/1999 | Strasser |

(Continued)

FOREIGN PATENT DOCUMENTS

EP    0967 675    12/1999

(Continued)

OTHER PUBLICATIONS

U.S. Appl. No. 10/861,416, filed Jun. 7, 2004, Bai et al.

(Continued)

*Primary Examiner*—Patrick Ryan
*Assistant Examiner*—Julian Mercado
(74) *Attorney, Agent, or Firm*—Ogilvy Renault LLP

(57) ABSTRACT

A method of flowing reactants over an ion exchange membrane in a fuel cell flow field plate is provided. The flow field plate is provided, comprising a network of flow channels in the plate bounded by an electrochemically active electrode, the network comprising a series of passages having parallel grooves, the passages being interconnected by a header providing a substantially even redistribution of fluid flow received from grooves of one passage to grooves of the next passage. A reactant fluid is supplied to create a flow across the network to achieve a desired reactant utilization, wherein a flow rate and a concentration of reactant molecules per active area of membrane in the grooves increase by less than 80% across the header.

14 Claims, 15 Drawing Sheets

U.S. PATENT DOCUMENTS

| | | |
|---|---|---|
| 5,945,232 A | 8/1999 | Ernst et al. |
| 5,998,055 A | 12/1999 | Kurita et al. |
| 6,017,648 A | 1/2000 | Jones |
| 6,037,072 A | 3/2000 | Wilson et al. |
| 6,048,633 A * | 4/2000 | Fujii et al. ............... 429/32 |
| 6,066,409 A | 5/2000 | Ronne et al. |
| 6,099,984 A | 8/2000 | Rock |
| 6,124,051 A | 9/2000 | Johnson |
| 6,150,049 A | 11/2000 | Nelson |
| 6,180,273 B1 | 1/2001 | Okamoto et al. |
| 6,207,310 B1 | 3/2001 | Wilson et al. |
| 6,255,011 B1 | 7/2001 | Fujii et al. |
| 6,309,773 B1 | 10/2001 | Rock |
| 6,403,249 B1 | 6/2002 | Reid |
| 6,416,895 B1 | 7/2002 | Voss et al. |
| 6,500,579 B1 | 12/2002 | Maeda et al. |
| 6,528,196 B1 * | 3/2003 | Fujii et al. ............... 429/34 |
| 6,602,625 B1 | 8/2003 | Chen et al. |
| 6,605,378 B2 | 8/2003 | Saito et al. |
| 6,649,293 B1 | 11/2003 | Jones |
| 6,684,948 B1 | 2/2004 | Savage et al. |
| 6,686,080 B2 | 2/2004 | Farkash et al. |
| 6,686,082 B2 | 2/2004 | Leger et al. |
| 6,692,859 B2 | 2/2004 | Mukerjee et al. |
| 2001/0001052 A1 | 5/2001 | Bonk et al. |
| 2001/0019793 A1 | 9/2001 | Tsuyoshi |
| 2001/0021470 A1 | 9/2001 | May et al. |
| 2001/0049046 A1 | 12/2001 | Butler |
| 2002/0045075 A1 | 4/2002 | Pinto et al. |
| 2002/0045084 A1 | 4/2002 | Fujii et al. |
| 2002/0081474 A1 | 6/2002 | Foster |
| 2002/0106548 A1 | 8/2002 | Chung et al. |
| 2002/0110723 A1 | 8/2002 | Farkash |
| 2002/0168560 A1 | 11/2002 | Mukerjee et al. |
| 2002/0187374 A1 | 12/2002 | Yamauchi et al. |
| 2002/0192531 A1 | 12/2002 | Zimmerman et al. |
| 2003/0003345 A1 | 1/2003 | Ohara et al. |
| 2003/0039876 A1 | 2/2003 | Knights et al. |
| 2003/0059662 A1 | 3/2003 | Debe et al. |
| 2003/0072986 A1 | 4/2003 | Kusakabe et al. |
| 2003/0099873 A1 | 5/2003 | Brambilla et al. |
| 2003/0104265 A1 | 6/2003 | Yoshimoto et al. |
| 2003/0118878 A1 | 6/2003 | Pinto |
| 2003/0138688 A1 | 7/2003 | Hattori et al. |
| 2003/0148157 A1 | 8/2003 | Grasso et al. |
| 2003/0152819 A1 | 8/2003 | Hatoh et al. |
| 2003/0170526 A1 | 9/2003 | Hodgson et al. |
| 2003/0180603 A1 | 9/2003 | Richards |
| 2003/0186106 A1 | 10/2003 | Frank et al. |
| 2003/0198839 A1 | 10/2003 | Bruck et al. |
| 2003/0211376 A1 | 11/2003 | Hatoh et al. |
| 2003/0219635 A1 | 11/2003 | Lee et al. |
| 2003/0219643 A1 | 11/2003 | Yang et al. |
| 2004/0018412 A1 | 1/2004 | Orsbon et al. |
| 2004/0023100 A1 | 2/2004 | Boff et al. |
| 2004/0175608 A1 | 9/2004 | Lisi et al. |

FOREIGN PATENT DOCUMENTS

| | | |
|---|---|---|
| EP | 1286408 | 12/2004 |
| JP | 56-134473 | 10/1981 |
| JP | 58-161269 | 9/1983 |
| JP | 6267564 | 9/1994 |
| JP | 7-22048 | 1/1995 |
| JP | 2001/043868 | 2/2001 |
| JP | 2003/077498 | 3/2003 |
| JP | 2003-142126 | 5/2003 |
| JP | 2004-055220 | 2/2004 |
| JP | 2004/192985 | 7/2004 |
| JP | 2005/038826 | 2/2005 |
| WO | WO 01/48843 A2 | 7/2001 |
| WO | WO 02/069426 A2 | 9/2002 |
| WO | WO 02/093668 A1 | 11/2002 |
| WO | WO 02/093672 A2 | 11/2002 |
| WO | WO 03/026049 A3 | 3/2003 |
| WO | WO2004/038841 | 5/2004 |

OTHER PUBLICATIONS

U.S. Appl. No. 10/861,409, filed Jun. 7, 2004, Bai et al.
Hirata et al. Journal of Power Sources vol. 83, pp. 41-49 1999.
Wang et al. Journal of Power Sources vol. 94, pp. 40-50 2001.
Neshai et al http:www.utc.scsu.edu/effects.htm last visited Aug. 5, 2003.
Lie et al. Journal of Power Sources, vol. 115, pp. 90-100 2003.
Yong et al. Journal of Power Sources vol. 118, pp. 193-199 2003.

* cited by examiner

Straight and Parallel Flow Channel Design

Single Serpentine Flow Channel Design

Multiple Serpentine Flow Channel Design

FLOW FIELD PLATE FOR USE IN FUEL CELLS

CROSS-REFERENCE TO RELATED APPLICATIONS

This is the first application filed for the present invention.

STATEMENT REGARDING US GOVERNMENT SPONSORED RESEARCH OR DEVELOPMENT

Not Applicable.

FIELD OF THE INVENTION

This invention relates to electrochemical fuel cells constructed of a single or multiple electrically conductive plates having inputs and outputs of fuel (e.g. hydrogen or reformate) and oxidant (e.g. $O_2$ or air) and coolant if necessary. More particularly, the present invention relates to fluid flow field plates.

BACKGROUND OF THE INVENTION

A fuel cell is a device in which a fuel and an oxidizing agent are continuously and independently supplied to the anode and cathode electrodes, respectively, to undertake electrochemical reactions by which chemical energy is converted directly into electrical energy and by-product of heat. Fuel Cells are therefore inherently clean and efficient and are uniquely able to address the issues of environmental degradation and energy security. They are also safe, quiet and very reliable. In the PEM fuel cells the electrolyte is a thin polymer membrane (such as Nafion™, polybenzimidazole (PBI)) that is permeable to protons, but does not conduct electrons, and the electrodes are typically made from carbon. Hydrogen flowing into the anode is split into hydrogen protons and electrons. The hydrogen protons permeate across the electrolyte to the cathode, while the electrons flow through an external circuit and provide power. Oxygen, commonly in the form of air, is supplied to the cathode and combines with the electrons arriving from external circuit and the hydrogen protons migrated from the anode to produce water and heat. These reactions at the electrodes are as follows:

Anode: 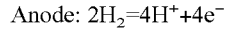 $2H_2 = 4H^+ + 4e^-$
Cathode: 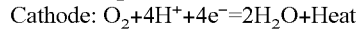 $O_2 + 4H^+ + 4e^- = 2H_2O + Heat$
Overall: 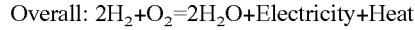 $2H_2 + O_2 = 2H_2O + Electricity + Heat$ PEM fuel cells using lithium-based membranes normally operate at a temperature of around 70-80° C., but may also operate at a temperature of about 100 to 200° C. if a high temperature membrane (such as polybenzimidazole (PBI)) is used. At these temperatures the electrochemical reactions would normally occur slowly so they need to be stimulated by a thin layer of catalysts containing such as platinum on each electrode. This electrode/electrolyte unit is called a membrane electrode assembly (MEA) and it is sandwiched between two flow field plates (or separator plates) to create a fuel cell. These plates contain grooves to channel the fuel to the electrodes and also conduct electrons out of the assembly. Generally, each cell produces around 0.6-0.8 volt, about enough power to run a light bulb. In order to generate a higher voltage a number of individual cells are combined in series to form a structure known as a fuel cell stack.

To operate the fuel cell stack efficiently, it is desirable to distribute the reactants uniformly across the active area of the cell, i.e. the fluid flow field. These objectives are achieved by providing open-faced fluid flow plates (or called separator plates sometimes). The flow field plate generally serves essentially important multiple functions, including as current collectors to provide electrical continuity between the fuel cell voltage terminals and electrodes, and as mechanical support for the membrane electrode assembly (MEA) as well as distributing the reactants and water across the active area of the MEA. It is well known that the performance of fuel cell is highly dependent on the efficient transport and uniform distribution of the reactants to the electrode catalysts, and on the appropriate water management of the cell, i.e. the supply and removal of water produced during operation of the fuel cell. Flow field design affects the fuel cell performance by controlling the reactant concentration gradient, flow rate, pressure drop, water distribution, and current density profile as well as electrode catalyst utilization efficiency.

A variety of flow field designs exist in the art, with conventional designs generally comprising either pin type or serpentine type designs. An earlier example of the pin-type flow field design is illustrated in U.S. Pat. No. 4,769,297 issued to Reiser et al. published on Sep. 6, 1988 in which an anode flow field plate and a cathode flow field plate have each projections, which may be referred to as pins. The reactants (fuel or oxidant) flow across the flow field plate through intervening grooves formed by the projections. A similar design disclosed in U.S. Pat. No. 4,826,742 issued to Reiser published on May 2, 1989 having a pin-type design teaches a plurality of channels connected to an inlet and an outlet headers at the two ends. The headers extend to an opening that forms an inlet manifold or outlet manifold, respectively. The plate was designed for dead-ended operation with predetermined purge frequency. U.S. Pat. No. 6,403,249 B1 issued to Reid on Jun. 11, 2002 disclosed a flow field plate of typical pin-type design to apply for air-air moisture exchange of a PEM fuel cell.

Similar to the pin-type configuration, the flow field can be formed based on thin metal or carbon foils or wire mesh configurations, which may be simple diagonal path-equivalent patterns formed by various metals including stainless steels. Examples of this type are illustrated in U.S. Pat. Nos. 6,207,310 and 6,037,072 issued to Wilson and Zawodzinski on Mar. 27, 2001.

As addressed by Mohamed et al. in WO 02/069426 A2 published on Sep. 6, 2002, the pin-type flow field design features low-pressure drop across the corresponding flow field, a significant advantage resulting in low parasitic power consumption in relation to the reactants compression and delivery. However, the disadvantages of such flow field design may include: reactants channeling and formation of stagnant areas, as well as poor water management because the reactants flowing through flow fields always tend to follow the path of least resistance.

To date, most flow field designs have been of the so-called serpentine type. An example of a flow field having a single serpentine design is illustrated in U.S. Pat. No. 4,988,583, issued to Watkins et al., in which a single continuous fluid flow channel is formed in a major area of flow field plate. Another example of a single serpentine design is illustrated in U.S. Pat. Nos. 5,527,363 and 5,521,018 issued to Wilkinson et al. on Jun. 18, 1996 and May 28, 1996 and in U.S. Pat. No. 5,108,849 issued to Watkins on Apr. 28, 1992. A reactant enters serpentine flow channel through the inlet fluid manifold and exits through the fluid outlet to the outlet manifold after flowing over a major part of the plate. In a single serpentine flow channel the reactants are forced to traverse the entire active area of the corresponding electrode, therefore eliminating the formation of stagnant areas. However, the reactants flowing through a single long channel would obviously create a substantially high-pressure drop, which in turn requires large parasitic power consumption, and a significant reactant concentration gradient from the inlet to outlet would result in higher cell voltage loss. Furthermore, the use of a single channel may promote water flooding, especially at high current densities. This will also lower the cell performance and shorten the cell lifetime.

A number of patents have addressed on the high-pressure drop problem associated with a single serpentine design by providing multiple serpentine designs. In such designs reactants from the inlet manifold are directed into several continuous snacking flow channels to the outlet manifold. Examples of such multiple serpentine flow field designs are illustrated in U.S. Pat. No. 5,108,849 issued to Watkins on Apr. 28, 1992 in which continuous open-faced fluid flow channels traverse the plate surface in multiple passes, i.e. in a serpentine manner. Each channel has a fluid inlet at one end and a fluid outlet at the other end, i.e. the fluid flow in a channel is in a continuous manner. The fluid inlet and outlet of each channel are directly connected to the fluid supply opening (or inlet manifold) and fluid exhaust opening (or outlet manifold), respectively. Other fluid flow field plates having multiple serpentine designs are also disclosed in U.S. Pat. No. 5,108,849 issued to Watkins et al. on Apr. 28, 1992, U.S. Pat. No. 6,150,049 issued to Nelson et al. on Nov. 21, 2000, U.S. Pat. No. 6,500,579 B1 issued to Hideo et al. on Dec. 31, 2002, WO 02093672 A2 and WO 02093668 A1 issued to Frank et al. on Nov. 21, 2002.

U.S. Pat. No. 5,686,199 issued to Cavalca et al. on Nov. 11, 1997 disclosed a flow field plate design in which the plate is divided into a plurality of substantially symmetric flow sectors having separate inlets and outlets communicating with the networks of supply and exhaust flow passages, respectively, while each flow sector includes a plurality of substantially parallel open-faced flow channels with each sector partitioned so as to subdivide the channels into a plurality of sets of channels disposed in serial flow relationship. It is claimed that this configuration permits the reactant gases to be transported to the entire active area of the corresponding fuel cell electrode with relatively low reactant gas pressure drop. However, due to the different lengths of the network channels communicating with inlet and outlet manifolds it may lead to unequal pressure drop of gases to different flow sectors, and consequently the reactant gases may not be able to be distributed uniformly into these symmetric flow sectors. Furthermore, extra pressure drop may be caused because of change in flow areas of the flow channels when the gases flow from supply channel to the sector.

U.S. Pat. No. 6,099,984 issued to Rock on Aug. 8, 2000 disclosed a PEM fuel cell having serpentine flow channels wherein the gas manifold fluidly connects to a plurality of fluid inlet/input legs at one end and a plurality of fluid outlet/output legs fluidly connects to outlet gas manifold. The inlet legs of each channel border the inlet legs of the next adjacent channels in the same flow field, and the outlet legs of each channel border the outlet legs of the next adjacent channels in the same flow field. Each flow channel travels in a portion of the flow field in a serpentine manner. It may be understood that the same flow rates from manifold to the different inlets may be hard to achieve.

U.S. Pat. No. 6,309,773 B1 issued to Rock on Oct. 30, 2001 further disclosed a PEM fuel cell having serpentine flow field channels comprising a plurality of serially linked serpentine segments extending between inlet and outlet manifolds. Each segment has an inlet leg, an exit leg, at least one medial leg there between and hairpin curved ends connecting the medial legs to other legs of the segment. A bridging section of each flow channel connects adjacent segments of the same channel to the next. The hairpin curved ends of the medial legs are spaced from bridging sections by different distances depending on the difference in pressure in the bridging section and the hairpin curved ends. Compared to the typical serpentine flow field designs, this design seems more complex, and may lead to an even higher pressure drop.

U.S. Pat. Nos. 5,521,018 and 5,300,370 issued to Wilkinson et al. published respectively on May 28, 1996 and Apr. 5, 1994 also disclosed a multiple serpentine design of fluid flow field comprising a continuous region and a discontinuous region. WO 0148843 A2 to Wilkinson et al. on Jul. 5, 2001 further disclosed a fuel cell plate with discrete fluid distribution feature. The employment of discontinuous and discrete flow channels is expected to improve fuel cell performance by enhancing mass transfer, but this is only appreciated when pressurized reactants sources are used.

It is understood that serpentine design of fluid flow field can promote reactant flow across the active area of the plate, and forces the movement of water through each channel to reduce water flooding. However, this type of flow field design has apparent drawbacks including: (a) long, narrow flow paths typically involving a plurality of turns leads to a large unfavorable pressure drop between the inlet and outlet, thus creating the need for pressurization of the reactant supplies, which translates to a significant parasitic power load which in turn reduces the amount of power otherwise available for delivery; (b) flooding of the electrode due to poor removal and accumulation of water, which reduces the efficiency and lifetime of the fuel cell. To promote the water removal from long channels it is a common practice that a larger reactant supply is used to maintain a sufficient high reactant speed across the channels. For instance, as high as 2.5-3.5 of air stoichiometry is commonly applied in PEM fuel cell operations. This obviously requires larger parasitic power consumption. Furthermore, the requirement of high reactant supply leads to small turn down ratio, greatly limiting the system operation flexibility; (c) long flow channels result in high gradient in reactant concentration from the inlet to outlet, which creates larger drop in over potential; (d) high reactant gradients also leads to non-uniform current density distribution and ineffective utilization of electrode catalysts that, in turn, results in the use of a larger stack size, increasing the cost of the system.

It has been well known in the field that a small fuel cell having only a few square centimeters of active area can produce a power density of about 1-2 W/cm2, while the figure becomes typically 0.1-0.3 W/cm2 when the fuel cell is increased to a few hundreds of square centimeters. This phenomenon is referred to as scale-up effect. It has been predicted that the current density and hydrogen concentration along the flow channel length has similar pattern that they decrease along the channel (Hirata et al., Journal of Power Sources, Vol. 83, pp. 41-49, 1999). Several recent publications including Wang et al. (Journal of Power Sources, Vol. 94, pp. 40-50, 2001), Neshai et al. (http://www.utc.scsu.edu/effects.htm, last visited on Aug. 5, 2003), Li et al. (Journal of Power Sources, Vol. 115, pp. 90-100, 2003), and Yong et al. (Journal of Power Sources, Vol. 118, pp. 193-199, 2003) carried out numerical and experimental studies of two-phase flow and current density distribution across serpentine flow channels. These studies showed that there is a dramatic variation or decrease of the local current density along the stream, and at the end of flow stream the electrochemical reaction is extremely weak. Typically, it was found that the local current density does not significantly vary over the first half of the membrane surface, but it sharply decreases over the second half of membrane surface. The results of oxygen distribution showed a similar trend, i.e. most of the inlet oxygen has been consumed at the half-length of the flow channel, leaving the channel outlet section nearly depleted of oxygen, leading to inefficient utilization of catalysts. In the entrance half-section, high reaction rate occurs accompanied by excessive hydrogen and oxygen consumptions. Due to depletion over the second half section, the air flow slows down, which consequently could lead to accumulation of liquid water decreasing PEMFC performance by creating high gas resistance (which is known as water flooding). From the result of Wang et al., it is found that at the average current density of 1.4 A/cm2 the local current density is 2.22 A/cm2 at the inlet, but only 0.86 A/cm2 near the outlet. At the midway of the flow channel the current density showed a sudden drop that marks the beginning of liquid water formation, suggesting a poor water removal from the channels given that the oxygen is nearly depleted. This phenomenon is to some extent due to the fact that the reactivity of fuel cell electrochemical reaction gradually declines from the hydrogen and oxygen inlets to the outlets, as these are consumed along the flow passages.

To address on the above problem, Japanese Patent No. 6267564 disclosed a fuel cell plate having such flow passage that at least any one of the depth or the width of the oxygen-containing gas delivering plate gradually decreases from an upstream flow passage region to a downstream flow passage region. Given the fact that the plate itself is fairly thick and the serpentine flow channels are lengthy, the above method would not be expected to be easy in terms of manufacturing and machining. In this context, U.S. Pat. No. 6,048,633 issued to Fuji et al. on Apr. 11, 2000 disclosed a fuel cell plate on which the number of grooves on the fuel inlet side is set to be larger than the number of grooves on the outlet side. The grooves are gradually merged with each other as they come to the outlet side (i.e. the number of grooves will be reduced half by half in a stepwise manner, e.g. 12-6-3). When the number of gas flow passage grooves is an odd number, the number of grooves will be decreased to a half number obtained by adding one (1) to the odd number of gas flow passage grooves. The ratio of the number of grooves on the inlet side to the number of grooves on the outlet side is set to correspond to the gas utilization factor.

The method disclosed in U.S. Pat. No. 6,048,633 enhances the uniformity of reactant gases over the active area, promotes water removal and improves gas diffusion, and consequently improves cell performance. However, the manner that the number of grooves decreases half by half inherently limits the design flexibility in selection of the flow passage numbers. For instance it is more convenient to have even numbers that can be easily decreased half by half in a stepwise manner. If we assume a gas consumption rate of 50% (corresponding to 70% $H_2$ utilization), and according to the patent, if the outlet has 5 channels, then it is only possible to have two passages, 10-5, giving a total 15 channels, which may not be enough to cover the required active area. Or, if a total of 100 channels needed to cover the required active surface, the channel arrangement will be about 67-33 (half-by-half reduction). With too many flow channels at each passage, the gas flow rate will be too low to properly remove the produced water. On the other hand, in order to cover all the active area and starting with 5 channels at the outlet, the number of grooves could be arranged like: 5-10-15-30-60-120. It follows that the ratio of groove numbers of inlet to outlet is no longer corresponding to the gas utilization factor (i.e. 50%). Furthermore, the method sets the number of grooves on the inlet side and the number of grooves on the outside corresponding to the gas utilization factor, but ignores the fact that the number of grooves in intermediate passages, when decreased half by half, does not provide uniformity as local gas flow rate decreases, generally following an exponential rule. This suggests that the flow rate may have dramatic change from one passage to the other, creating local non-uniformity and pressure loss due to suddenly acceleration or deceleration. Furthermore, the disclosed method actually only ensures nearly constant gas flow rate, not reactant molecules per active area.

In conclusion, there is accordingly a need for a fuel cell stack that overcomes the above-mentioned disadvantages of the prior art.

SUMMARY OF THE INVENTION

Accordingly, an object of the present invention is to provide an improved fuel cell stack that features a fluid flow field having improved weight, size and manufacturability characteristics.

It is another object of the present invention to provide a flow field plate that is thin, light, low-cost, durable, highly conductive and has a corrosion-resistant structure that provides an effective environment to achieve a desired performance.

The flow field design incorporates the electrochemical reaction features to improve utilization of electrode catalysts. In accordance with the fact that fuel and oxidant concentrations and flow rates are high at the inlet section of the flow field, decrease gradually toward the outlet section of the flow field with progress in electrochemical reaction, commonly in, but not limited to, an exponential decay, the present invention discloses a flow field design that accordingly varies the flow area to provide nearly constant reactant concentration per active area and a nearly constant flow rate across the entire active area. The present invention provides a design procedure of the flow field channels in which the number of channels on the inlet side is greater than any downstream passages. The decrease rate in the number of flow channels follows, for example, an exponential rule that represents the variation in the reactant flow rate according to the cell electrochemical reactions. Two approaches are disclosed to determine the decrease rate in the number of flow channels, namely (I) "Constant Gas Flow Rate Approach" and (11) "Constant Reactant Molecules per Active Area Approach", with both following exponential decay, and not necessarily being half by half as disclosed in U.S. Pat. No. 6,048,633. The present invention will therefore increase the flexibility of the flow field design, while ensuring best performance to be achieved.

Furthermore, the main features of the fluid flow field filed designs of the invention include: (a): effectively and uniformly transport the reactants across the flow field of the plate while eliminating areas of stagnant flow; (b): maintaining sufficient and constant fluid velocity over the entire flow field to ensure adequate water removal and management to eliminate the water flooding without jeopardizing with high reactant gas supply, leading to savings in parasitic power consumption; (c): the ability to achieve uniform electrochemical reaction and to enhance gas diffusion, leading to uniform current density distribution over the active area of the plate. As a result of increased utilization of electrode catalysts, the cell size can be reduced, leading to considerable reductions in costs of plate material, MEA, sealing, and manufacturing.

According to a first broad aspect of the present invention, there is provided a method of flowing reactants over an electrochemically active catalyst surface in a fuel cell flow field plate, the method comprising the steps of: providing a network of flow channels in the plate bounded by an electrochemically active catalyst surface, the network comprising a series of passages having parallel grooves, the passages being interconnected by a header providing a substantially even redistribution of fluid flow received from grooves of one passage to grooves of the next passage; and supplying reactant fluid to create a flow across the network to achieve a desired reactant utilization, wherein a flow rate and a concentration of reactant molecules per active area of membrane in the grooves increases by less than 80% across the header.

BRIEF DESCRIPTION OF THE DRAWINGS

These and other features, aspects and advantages of the present invention will become better understood with regard to the following description and accompanying drawings wherein.

DETAILED DESCRIPTION OF THE PREFERRED EMBODIMENT

Figure 1:
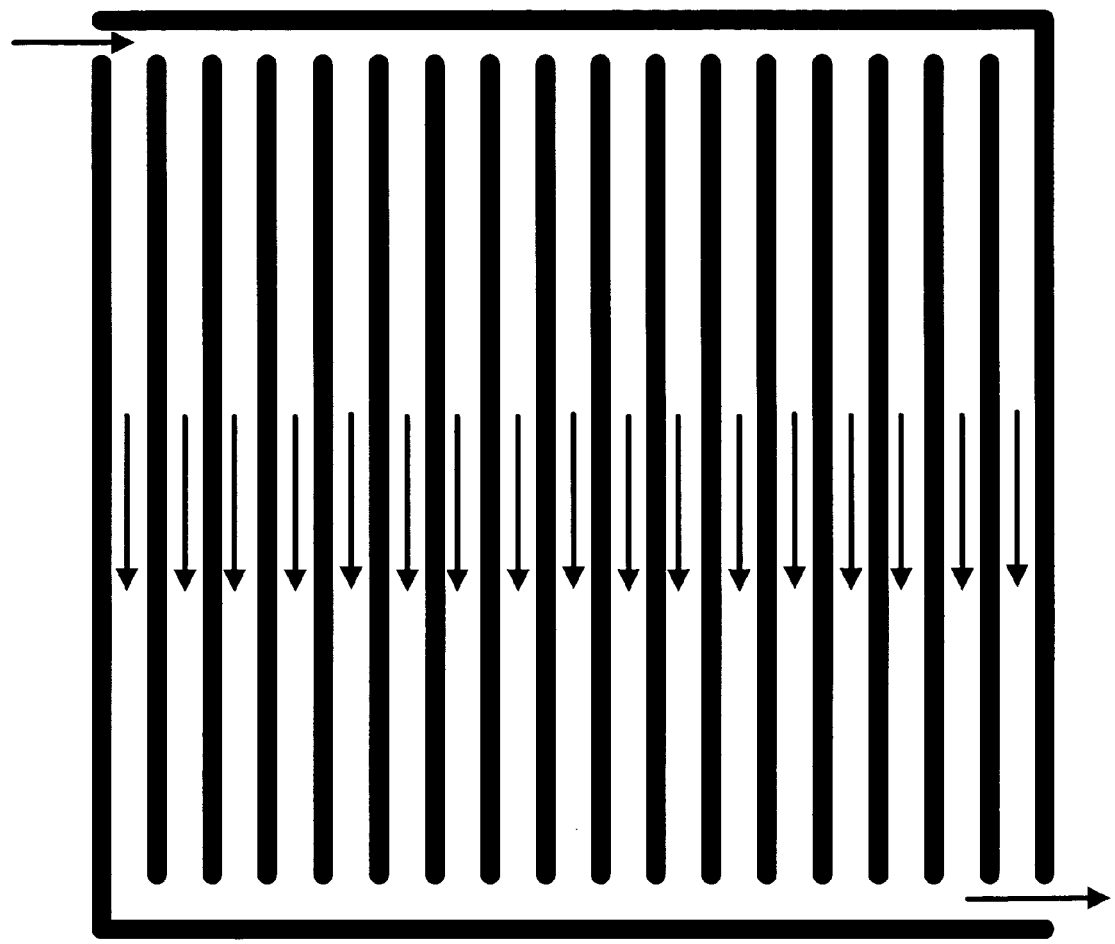
FIG. 1 is a plan view of a prior art flow field plate having a straight and parallel flow channel design.
Figure 2:
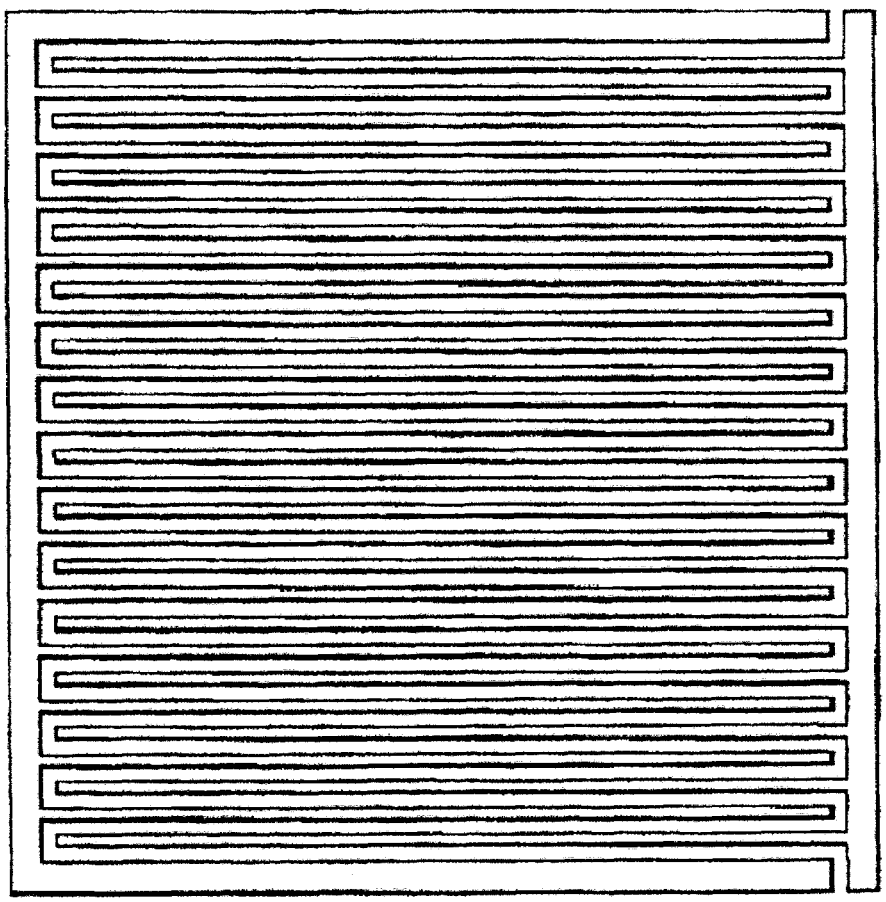
FIG. 2 is a plan view of a prior art flow field plate having a dingle serpentine flow channel design.
Figure 3:
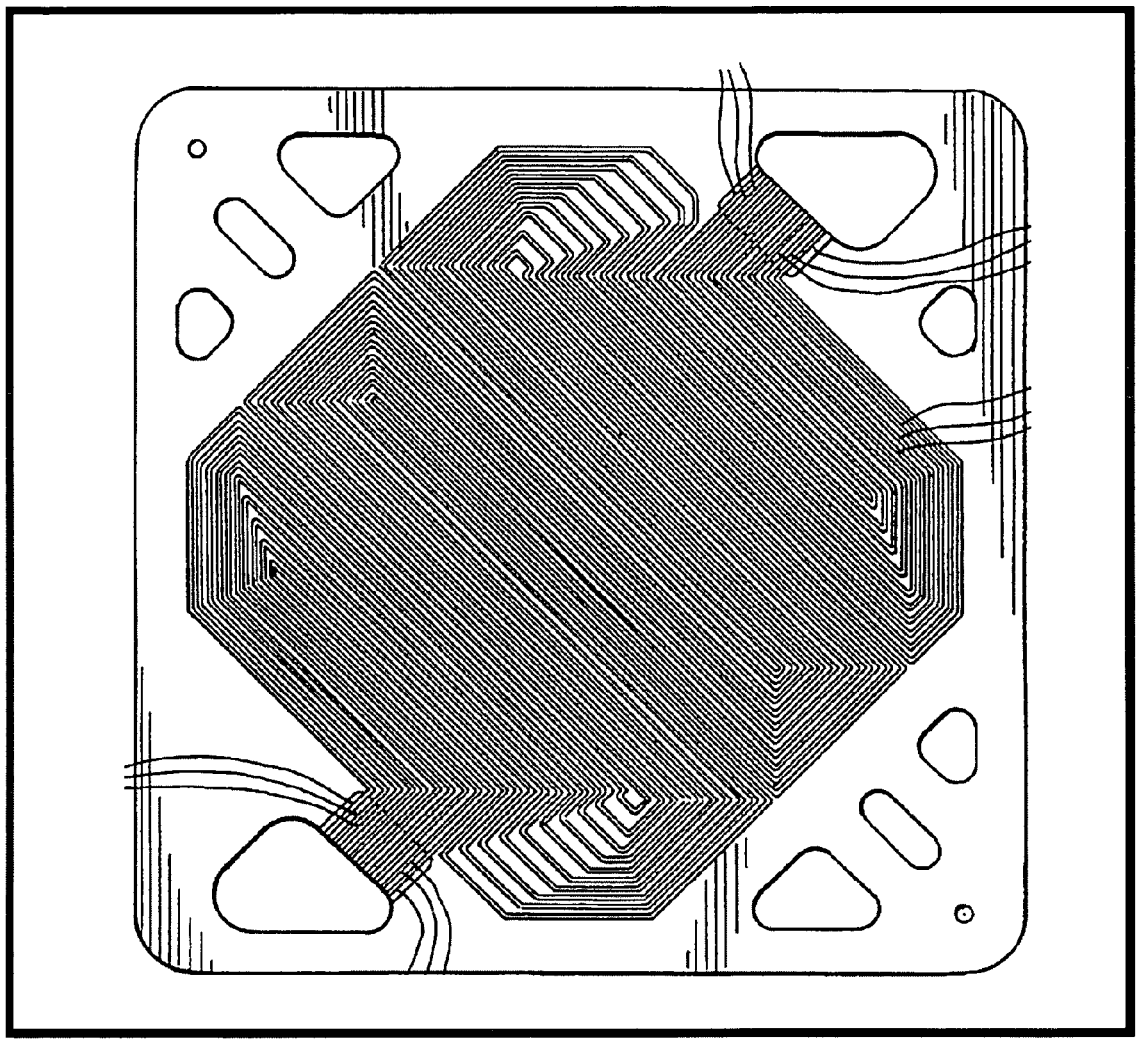
FIG. 3 is a plan view of a prior art flow field plate having a multiple serpentine flow channel design.

In order to design a flow field reflecting the principle feature of the present invention, it is necessary to define the gas utilization factor before presenting the embodiments of the present invention.

Let the volumetric flow rate initially introduced to a fuel cell stack (fuel or oxidant) be $F_0$, the active reactant volumetric concentration $y_0$, and the reactant utilization efficiency (i.e. reverse of the stoichiometry) $\rho_0$. To illustrate the invention, we also assume that the apparent kinetics of the cell electrochemical reaction is one order respective to the active component (hydrogen or oxygen), although it can be an order ranging from 0.5 to 2 and the order can be different for the anode respective to hydrogen and for the cathode respective to oxygen. Based on this assumption, therefore, the variation in the reactant flow rate will follow an exponential manner, i.e. $F_c = F_0 y_0 \exp(-\beta x)$, where $F_c$ is the local reactant flow rate at the distance of x from the inlet, and $\beta$ is the decay factor. Therefore, the total gas flow rate at the distance x from the inlet can be expressed as:

$$F = F_0(1-y_0) + F_0 y_0 \exp(-\beta x) \quad (1)$$

Applying the definitions of the following:

$$\eta_0 = \text{The Reactant Utilization Efficiency}$$
$$= \frac{\text{Initial Flow Rate} - \text{Outlet Flow Rate}}{\text{Initial Flow Rate}}$$
$$= 1 - \exp(-\beta L)$$

$$\alpha = \text{The Gas Utilization Factor}$$
$$= \frac{\text{Initial Gas Flow Rate} - \text{Outlet Gas Flow Rate}}{\text{Initial Gas Flow Rate}}$$
$$= y_0 \eta_0$$

We then have the gas flow rate expressed as:

$$F = F_0 \left[ 1 - y_0 \left(1 - \exp\left(\frac{\ln(1-\eta_0)}{L}\right)x\right) \right] \quad (2)$$

If we substitute the coordinate x with the number of passage, n, the above equation becomes (where N is the total number of passages from the inlet to the outlet):

$$F = F_0 \left[ 1 - y_0 \left(1 - \exp\left(\frac{\ln(1-\eta_0)}{N-1}\right)(n-1)\right) \right] \quad (3)$$

Now, we have two approaches in designing the flow channels that will gradually decrease in the numbers of flow channels from the inlet to the outlet:

Constant gas flow rate:

$$u = \frac{\text{Gas flow rate}}{\text{Flow Area}}$$
$$= \frac{\text{Gas flow rate}}{\text{Number of Flow Channles} \times \text{Flow Area per Channel}}$$

This would result in the following for the number of grooves of the ith passage:

$$n_i = n_0 \left[ 1 - y_0 \left(1 - \exp\left[\frac{\ln(1-\eta_0)}{N-1}(i-1)\right]\right) \right] \quad (4)$$

Constant reactant molecules per active area.

$$c = \frac{\text{Reactant Flow Rate}}{\text{Flow Area}}$$
$$= \frac{\text{Reactant Flow Rate}}{\text{Number of Flow Channles} \times \text{Flow Area per Channel}}$$

This would result in the following for the number of grooves of the ith passage:

$$n_i = n_0 \exp\left[\frac{\ln(1-\eta_0)}{N-1}(i-1)\right] \quad (5)$$

Table 1 provides calculation examples that show the differences between the two approaches described above.

TABLE 1

Conditions: Fuel Side
Hydrogen concentration: 70%;
Hydrogen Utilization: 80%;
Gas Utilization Factor: 0.56;
The number of grooves on the inlet side: 34

| | |
|---|---|
| (I) Constant gas flow rate approach | 34 - 27 -22 -19 - 16 -14 (6 passages) |
| | 34 - 26 -20 -17 - 14 (5 passages) |
| | 34 - 24 -18 -14 (4 passages) |
| | 34 - 20 -14 (3 passages) |
| (II) Constant reactant molecules per active area approach | 34 - 25 -18 -13 - 9 -7 (6 passages) |
| | 34 - 23 -15 -10 -7 (5 passages) |
| | 34 - 20 -12 -7 (4 passages) |
| | 34 -15 -7 (3 passages) |

Conditions: Air Side
Oxygen concentration: 21%;
Oxygen Utilization: 50%;
Gas Utilization Factor: 0.105;
The number of grooves on the inlet side: 34

| | |
|---|---|
| (I) Constant gas flow rate approach | 34 - 33 -32 -32 - 31 -30 (6 passages) |
| | 34 - 33 -32 -31 -30 (5 passages) |
| | 34 - 33 -31 -30 (4 passages) |
| | 34 - 32 -30 (3 passages) |
| (II) Constant reactant molecules per active area approach | 34 - 30 -26 -22 - 20 -17 (6 passages) |
| | 34 - 29 -24 -20 -17 (5 passages) |
| | 34 - 27 -21 -17 (4 passages) |
| | 34 - 24 -17 (3 passages) |

In practice, the constant gas flow rate approach may favour a minimum pressure loss and improved water removal, and the constant reactant molecules per active area approach may benefit the effective utilization of catalysts and enhancing water removal with certain increase in pressure loss because the gas velocity will actually be in acceleration while the reactant molecules per area keep the same along the flow passages. The practical flow field can be designed with one of the above two approaches or both of them, for example, one for the anode plate and the other for the cathode plate.

It is to be understood that data in Table 1 is provided for the purpose of illustration only. The number of grooves on the inlet side and the number of passages are not necessarily the same, and instead they can be adjusted accordingly to meet the practical design requirements such as pressure loss, residence time, and total active area. Also, the orders of electrochemical reactions with respect to hydrogen at anode and oxygen at cathode are not necessarily the same, and therefore the above equations (1) to (5) can be separately derived accordingly.

It is understood that due to the low utilization of oxidant, the oxidant flow is generally much higher than the fuel flow. It is therefore desirable to have a large number of flow channels and small number of flow passages for the oxidant in order to attain a small pressure drop, while for the fuel side it is preferable to have relatively more passages in order to increase fuel utilization. Therefore, adjusting the inlet number of flow channels and the number of flow passages independently for the anode and the cathode will allow attaining an optimal performance. For example, with the approach of constant reactant molecules per active area, a flow field of 36-28-21-17 for the cathode and a flow field of 34-24-17-12-9-6 will make together an active area having a total of 102 channels, while the pressure drop of cathode is smaller and the hydrogen utilization is higher.

As described above, the flow area for the reactants reduces stepwise in the downstream direction, and therefore one would expect an increase in pressure drop for the reactants when compared to the prior art flow pathways having constant flow area or constant number of flow channels. While a slight pressure drop increase may be observed, it can be appreciated that the increase will not be significant since the flow rate is also reduced in the downstream direction. Furthermore, with high gas velocity downstream according to the present invention, such an increase would actually be beneficial in preventing water from condensation.

To achieve uniform reactant gas distribution and improve cell performance, the dimensions of flow channel width, depth and land (the separation between adjacent grooves) width are preferably in the range of 0.5 to 2.5 mm, 0.5 to 2.5 mm and 0.5 to 2.0 mm. Most preferably they are in the range of 1.0 to 2.0 mm, 1.0 to 2.0 mm and 0.5 to 1.0 mm.

It is understood that flow channel and land are preferably to have the same dimensions for the anode side and cathode side, however different dimensions for the anode and cathode flow channel and land can also be arranged.

While the above description of flow channels refers to constant cross-sectional grooves, however, such geometric preference is not needed to practice the invention and thus other geometry of flow channels like variable cross-section grooves are possible in other embodiments of the invention.

Figure 15:
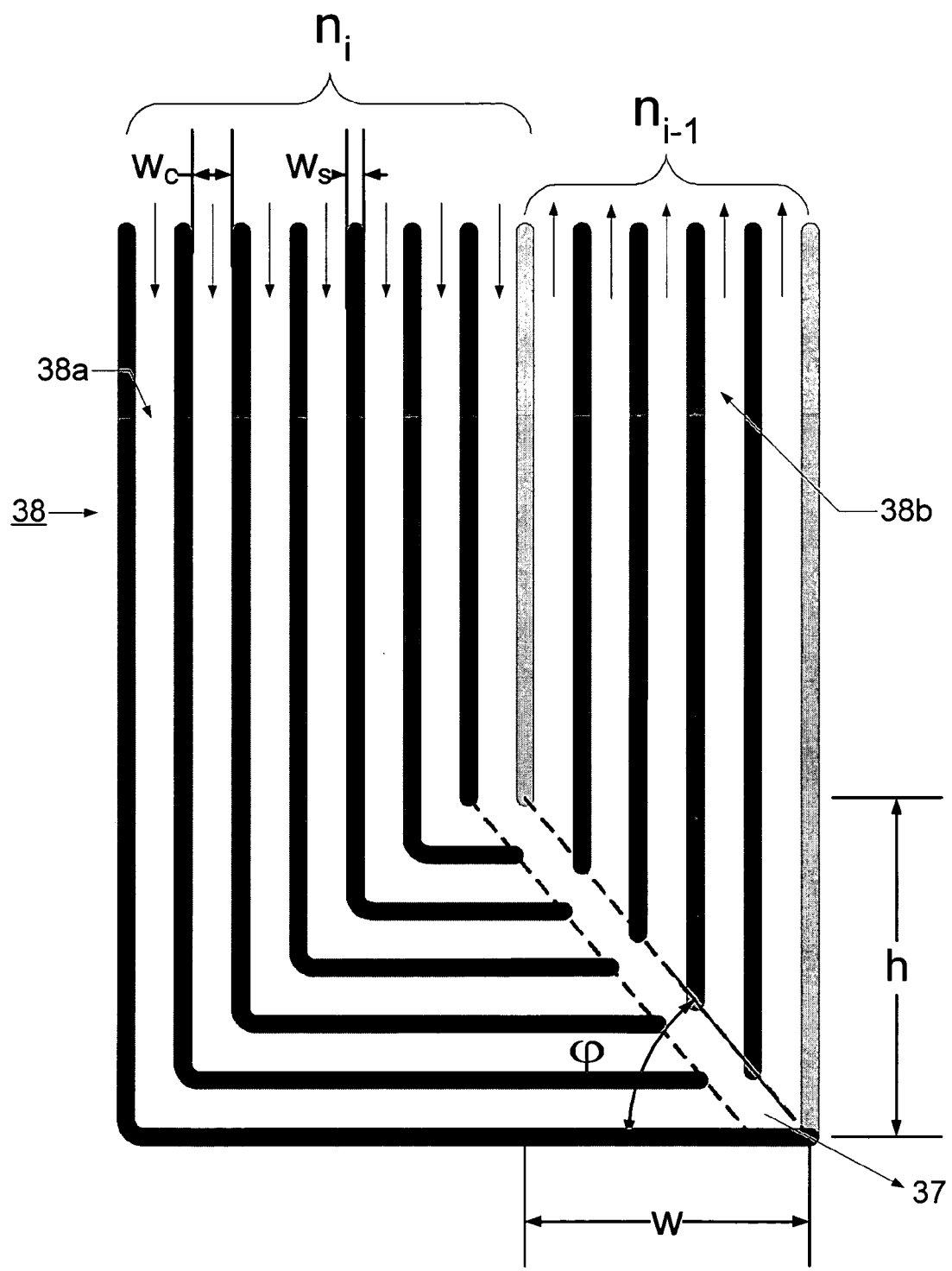
FIG. 15 is a fragmented enlarged view of a flow field plate having a sloped header according to a second embodiment of the present invention.

With respect to FIG. 15 and in accordance with the present invention, the flow channels 38 from upstream passage having larger number of channels are fluidly connected to the next downstream passage having smaller number of channels through a header 37, which could be parallel, vertical to the flow channels, and preferably sloped against the flow channels 38. Such a sloped design would provide uniform channel distribution (identical channel pitches) over the bend section as the same as the flow channels upstream and downstream. The uniform channel pitches create uniform mechanical support from land areas to MEA, and therefore ensure minimum mechanical and thermal stress applied to MEA by the plates. For a sloped header 37, such as the one illustrated in FIG. 15, the slope angle $\phi$ can be determined by:

$$\tan(\varphi) = \frac{n_i w_c + (n_i - 1)w_s}{n_{i-1} w_c + (n_{i-1} - 1)w_s}$$

In the above equation, n is the number of flow channels 38, $w_c$ and $w_s$ are widths of flow channel 38 and land, respectively, while i is the number of flow passages.

The fluid connection header 37 is open-faced, and therefore allows for fluid redistribution from upstream channels 38 to downstream channels 38.

It should be understood that while the above description is presented with respect to open-faced, sloped headers 37, those skilled in the art will appreciate numerous modifications and variations thereto. For example, the header 37 can be at any other angle between 0° to 90°. The header 37 could also have other structural features such as interdigitated, discontinuous, half-or fully walled.

Figure 4:
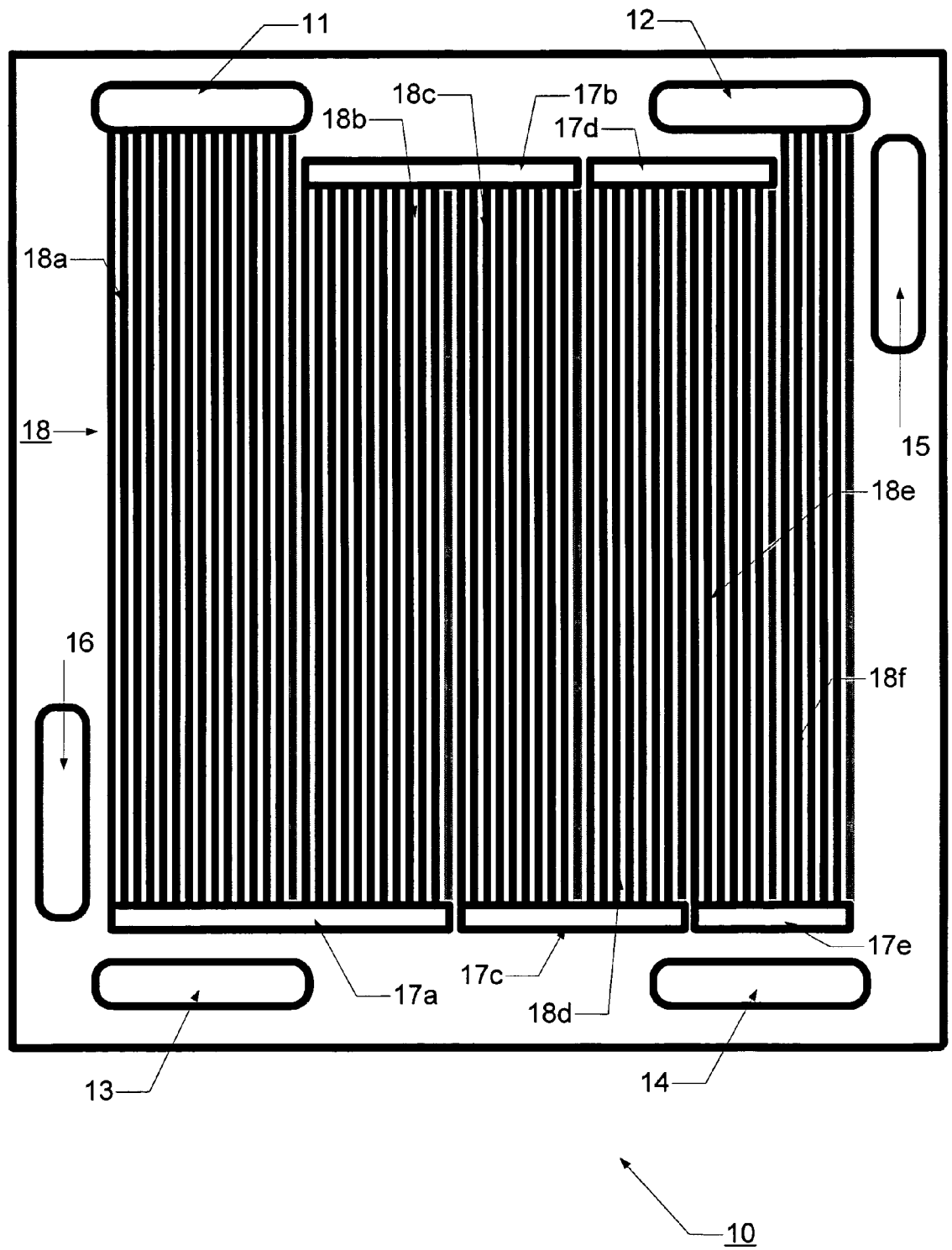
FIG. 4 is a plan view of an anode flow field plate according to a first embodiment of the present invention.

FIG. 4 illustrates a first embodiment of the present invention providing a nearly constant flow rate over the entire active area. FIG. 4 is illustrated to correspond to an anode plate, with assumptions of 70% hydrogen concentration in reformate and 80% hydrogen utilization efficiency.

Generally, the flow field plate 10 includes a network of supply flow passages or inlet manifold 11 for supplying the fuel to the flow field 18 and a network of flow passages or outlet manifold 12 for receiving the reactants discharging from the flow field. The flow field includes a single or plurality of inlets or outlets fluidly communicating with the networks of supplying and exhausting flow passages. On the flow field plate 10, there may also be inlets 13 for oxygen-containing gas supply, outlets 14 for the oxygen-containing gas exhaust, inlets 16 and outlets 15 for coolant flow.

As shown in FIG. 4, the reactant gas flows through the manifold 11 fluidly communicating with plurality of flow channels 18a. While the flow field plate 10 in FIG. 4 shows 15 flow channels, it is to be understood that in practice the number of channels will be determined so as to meet the design requirements. It can be appreciated by one skilled in the art that the manifold 11 can be of various regular or irregular geometric shapes, different from the one shown in FIG. 4.

The flow channels 18 shown in FIG. 4 are illustrated as multiple parallel straight configurations, which are easy to manufacture and provide smaller pressure drops. At the end of each passage of the flow channels 18a to 18f a collecting and redistributing mechanism or header 17a to 17e is provided. The headers 17 also provide a way that enables changing the number of flow channels 18 in a desired manner, not necessarily half by half.

It is understood that after passing through each passage (18a to 18f) the reactant gas concentration (hydrogen or hydrogen rich reformate) and the flow rate are reduced, following the aggressive electrochemical reactions in the entrance section. The decrease in the number of flow channels 18 shown illustratively in FIG. 4 is carried out by the constant gas flow rate approach as described above, i.e. 15-12-10-8-7-6. The ratio between the number of grooves on the outlet side and the number of the grooves on the inlet side corresponds to the gas utilization factor (0.56 in this case).

Figure 5:
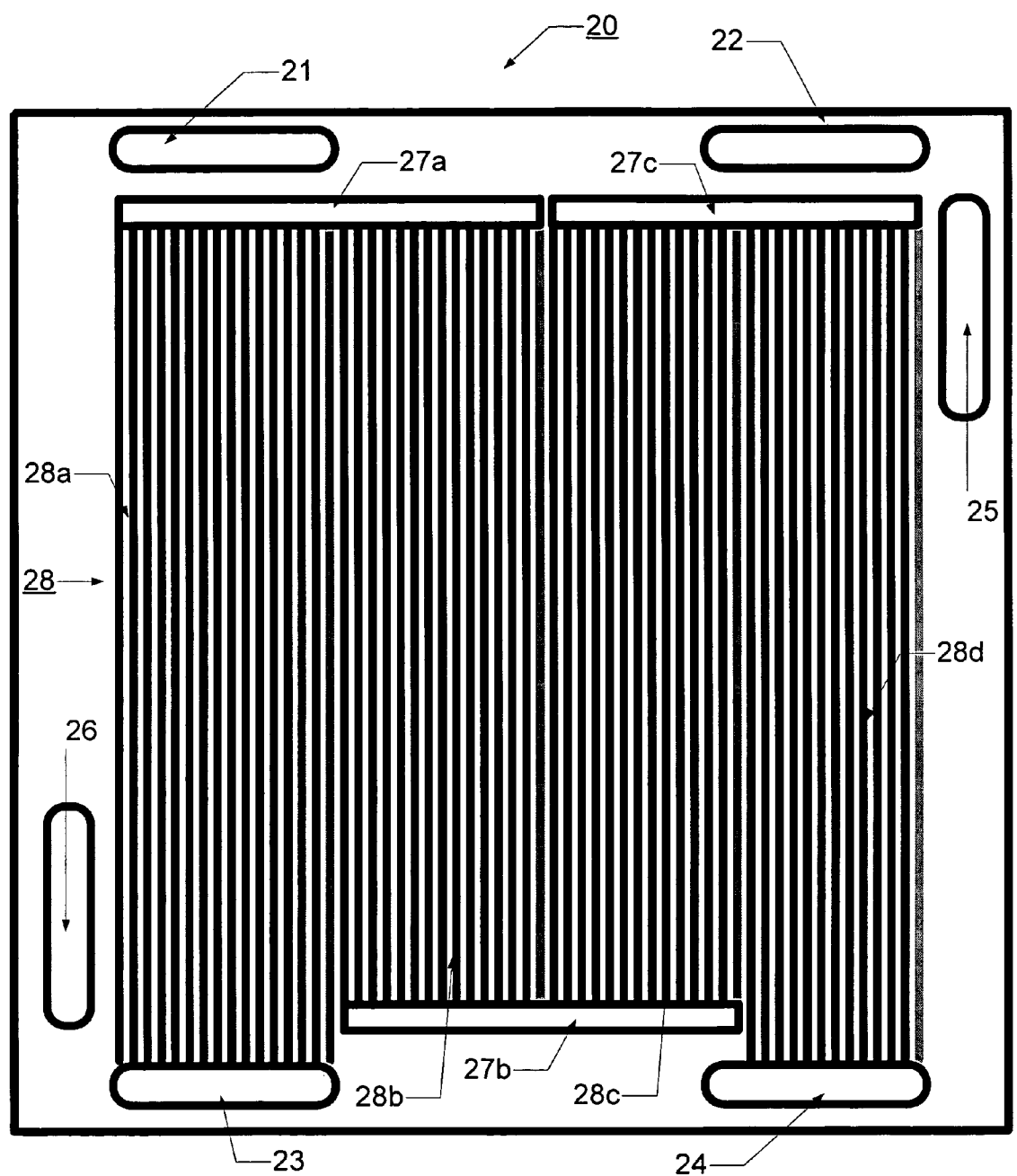
FIG. 5 is a plan view of an cathode flow field plate according to a first embodiment of the present invention.

While a similar flow field can be applied for both the anode and cathode, it is preferred to have designs corresponding to their different requirements in terms of gas utilization and reactant concentration for the fuel and oxidant. FIG. 5 illustrates an embodiment of a cathode flow field plate 20, corresponding to the anode plate of FIG. 4 with the same active area. Each one of the field flow plates 10, 20 have 58 channels. The ratio of the number of grooves on the outlet side to the number of the grooves on the inlet side corresponds to the air utilization factor, which is about 0.89 in this case with 21% oxygen in the air and 50% oxygen utilization. The flow field also employs multiple parallel straight channels 28 that have 4 passages (16-15-14-13). The oxygen or oxygen-containing gas (usually air) is distributed from the manifold 23 into a plurality of flow channels 28 of the first passage 28a, which are successively connected and redistributed into flow channels 28b, 28c, and 28d through headers 27a to 27c. After each header 27 the number of flow channels 28 is decreased according to the determined decreasing rate as described above.

Stacking the first plate 10 as shown in FIG. 4 and the second plate 20 as shown in FIG. 5 face-to-face and inserting the MEA and sealing gasket between the two plates 10, 20 would form a single fuel cell. It is understood that in this case the fuel flow and the oxidant flow follow in a counter-current fashion. However, it should be understood that alternative flow configurations, such as cross-flow and co-current flow for example, are within the scope of application of the principles the present invention.

Figure 6:
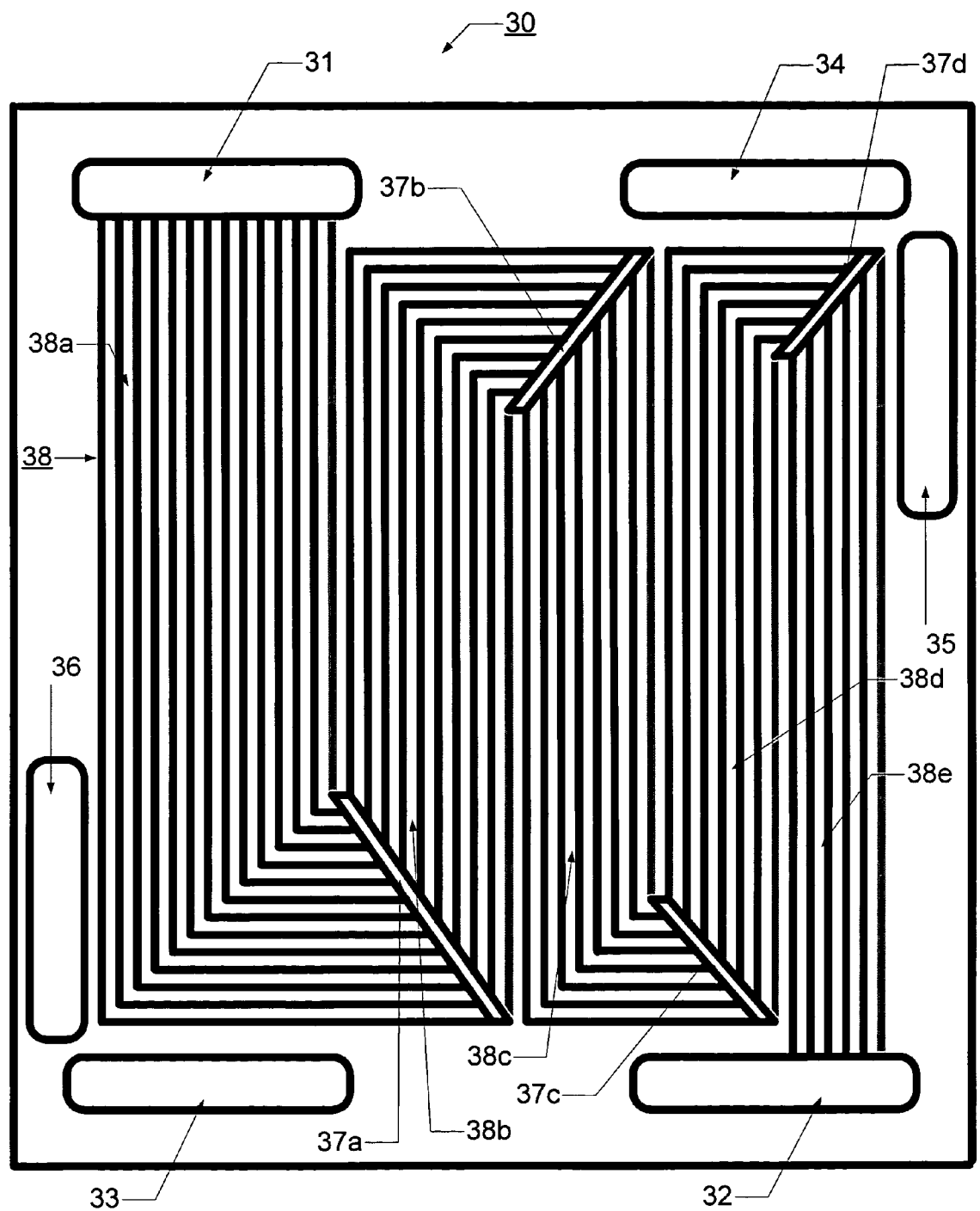
FIG. 6 is a plan view of a cathode flow field plate according to a second embodiment of the present invention.
Figure 7:
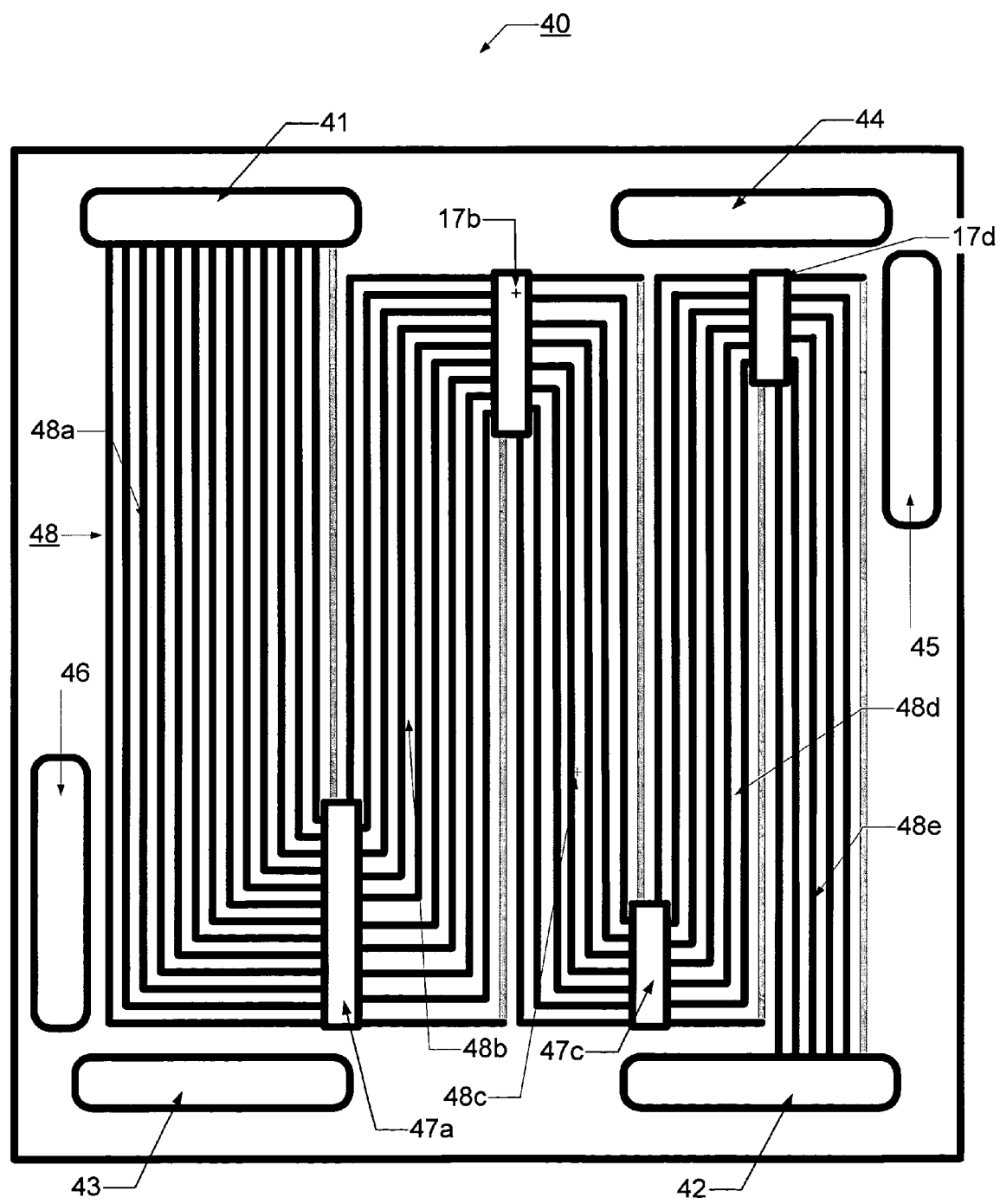
FIG. 7 is a plan view of an anode flow field plate according to a third embodiment of the present invention.

FIGS. 6 and 7 illustrate anode flow field plates 30, 40 according to a second and a third embodiment according to the present invention, in which the flow channels are provided in a fashion similar to the conventional serpentine pattern. Similarly to FIG. 4 these two figures show the flow field based on a "Constant Gas Flow Rate Approach" in which a hydrogen concentration of 70% and a hydrogen utilization of 80% are assumed. The flow channels 38, 48 are reduced as 14-10-8-7-6, for a total of 45 channels. Replacing the headers 17 in FIG. 1, several connecting and redistributing mechanisms 37, 47 are provided, which allow the flow channels 38, 48 to decrease from the number in a previous zone to the number of the following zone according to the determined decrease rate.

Figure 8:
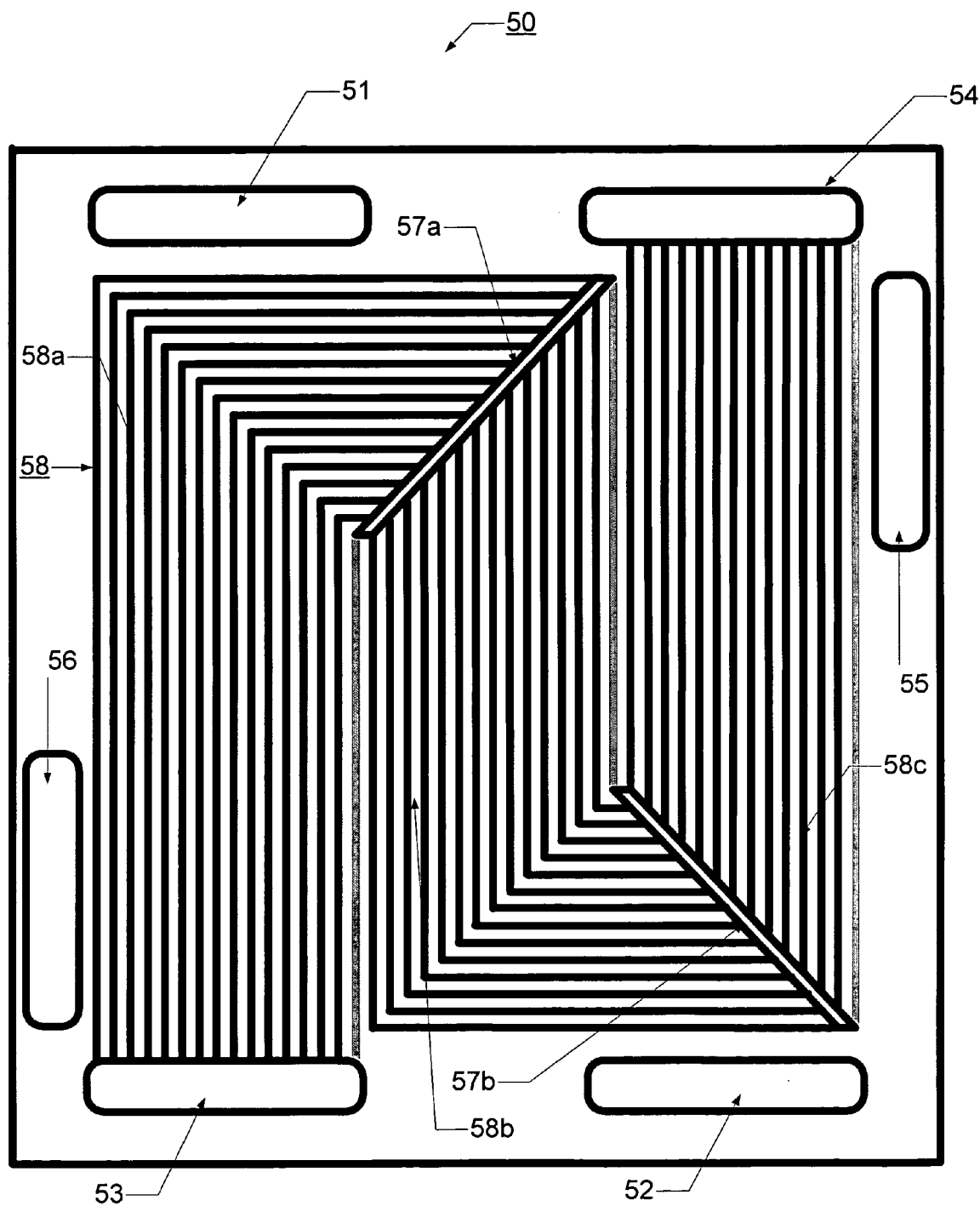
FIG. 8 is a plan view of a cathode flow field plate according to a second embodiment of the present invention.
Figure 9:
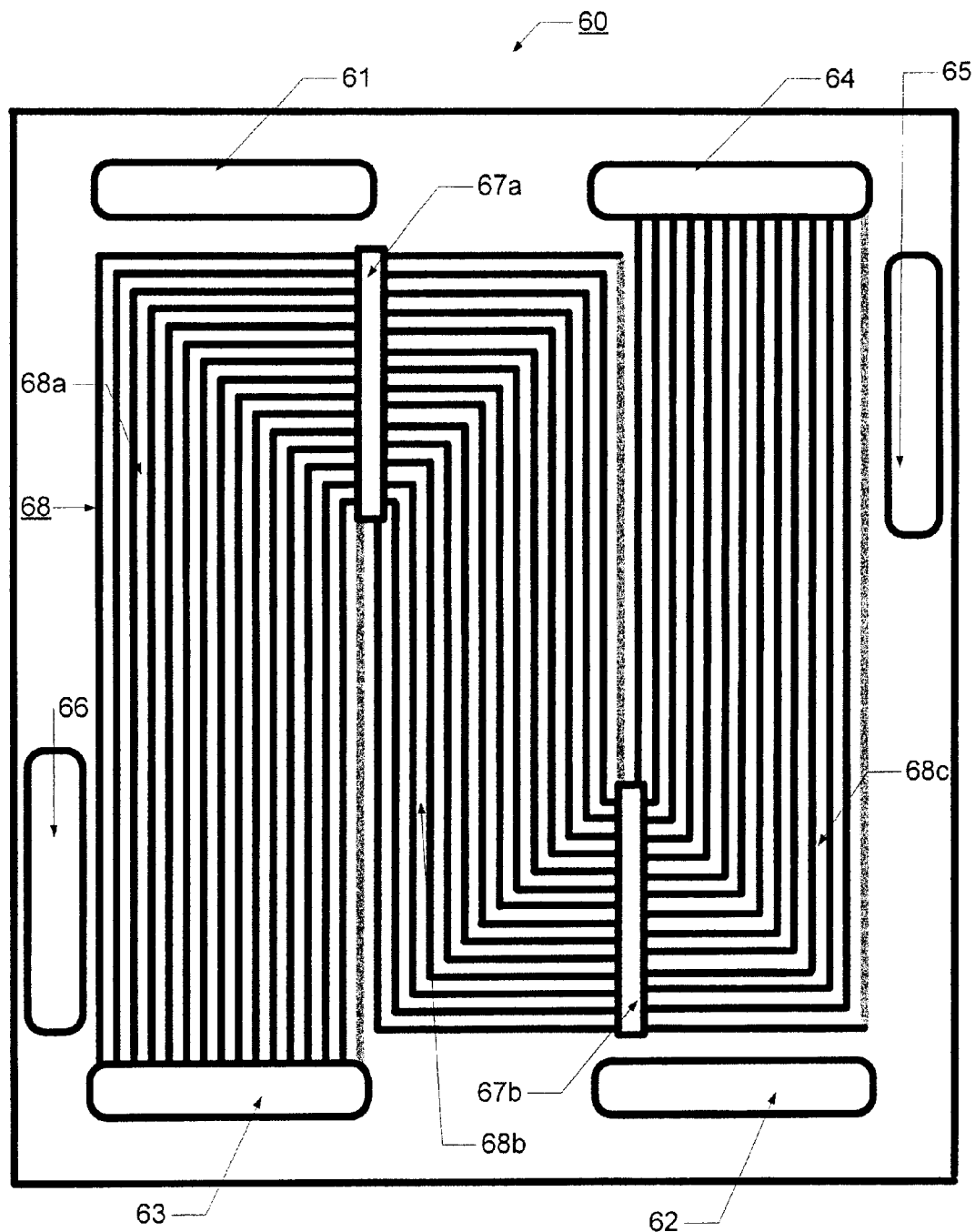
FIG. 9 is a plan view of a cathode flow field plate according to a third embodiment of the present invention.

FIGS. 8 and 9 schematically show cathode flow field plates 50, 60 according to a second and third embodiment of the present invention, in which the flow channels 58, 68 are provided in a fashion similar to the conventional serpentine pattern. Similarly to FIG. 5 these two figures show the flow field based on "Constant Gas Flow Rate Approach" in which an oxygen concentration of 21% and an oxygen utilization of 50% are assumed. The flow channels 58, 68 are reduced as 16-15-14, giving a total of 45 channels. Replacing the headers 27 in FIG. 5, several connecting and redistributing mechanisms 57, 67 are provided, which allow the flow channels 58, 68 to decrease from the number in a previous zone to the number of the following zone according to the determined decreasing rate.

It is noted that while the flow field plates as illustrated in FIGS. 4-9 are shown to be typically of the conventional shape, it should be understood that the novel features of the flow field plate and included flow field of the present invention are not limited to any particular geometric shape.

Figure 10:
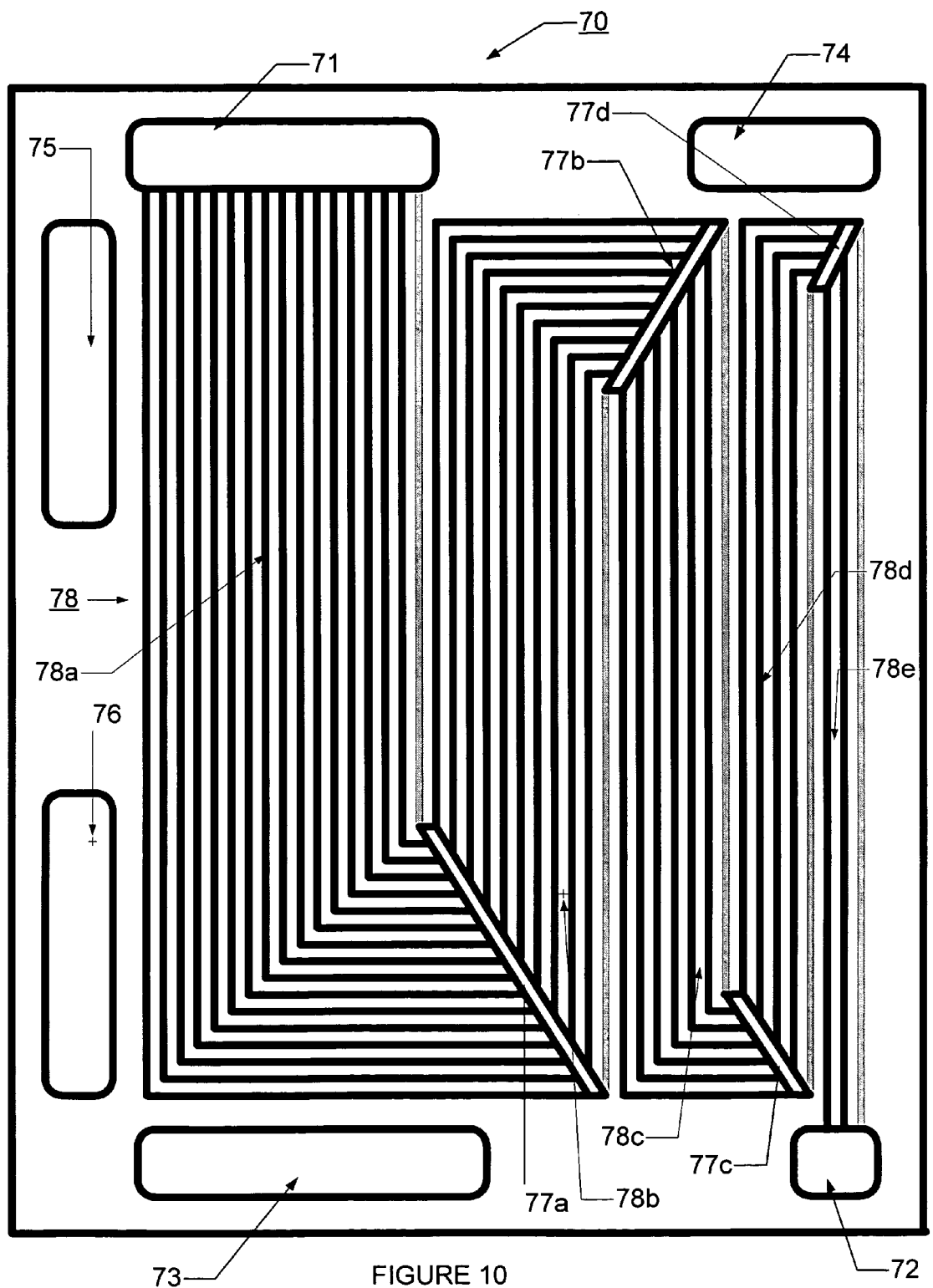
FIG. 10 is a plan view of an anode flow field plate according to a fourth embodiment of the present invention.
Figure 11:
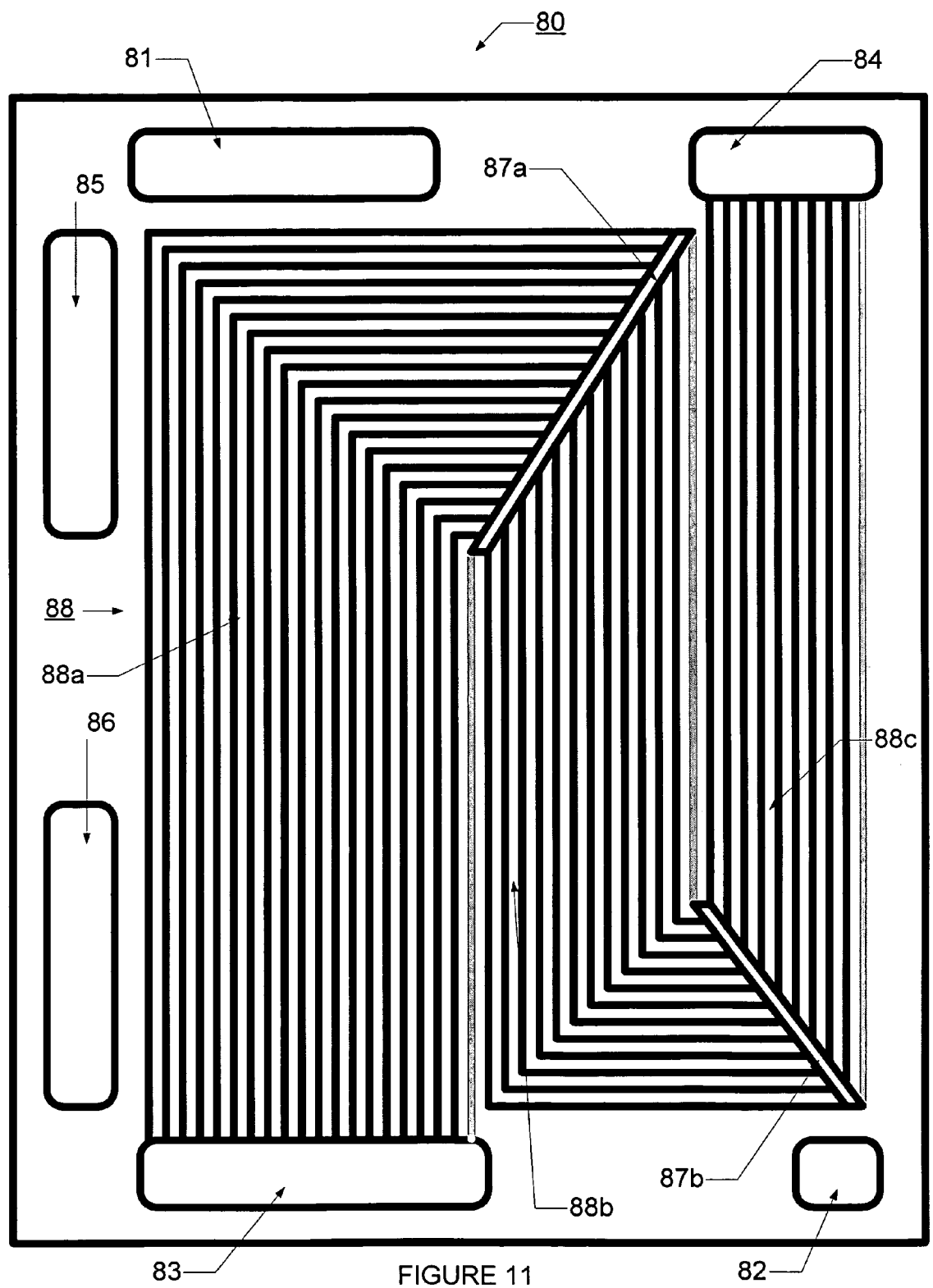
FIG. 11 is a plan view of an cathode flow field plate according to a fourth embodiment of the present invention.

Now, referring to FIG. 10 and to FIG. 11, there is shown a fourth embodiment of the present invention, based on the approach of "Constant Molecules per Active Area", which would maximize the utilization of the catalysts. The anode plate 70 of FIG. 10 is assumed to have a 70% hydrogen concentration and an 80% hydrogen utilization. The cathode plate 80 of FIG. 11 assumed an oxygen concentration of 21% and an oxygen utilization of 50%. Based on this approach, the number of grooves will decrease exponentially (equation (5)) to the number that equals the number on the inlet side multiplied by $(1-\eta_o)$. In the case of FIG. 10, the number of grooves decreases as 16-11-7-5-3, while in FIG. 11 it is 19-13-10, with both giving the same total of 42 channels. Compared to the approach of "Constant Gas Flow Rate", the approach of "Constant Molecules per Active Area" leads to faster decrease in the number of flow channels or flow areas from the inlet toward the outlet. Therefore, the gas velocity would expect to increase from the previous passage to the next, which would enhance water removal even though the pressure may be somewhat higher. And, since the catalyst utilization and the current density are expected to increase greatly, the size of the fuel cell size is smaller, leading to a reduction in cell volume and cost.

Figure 12:
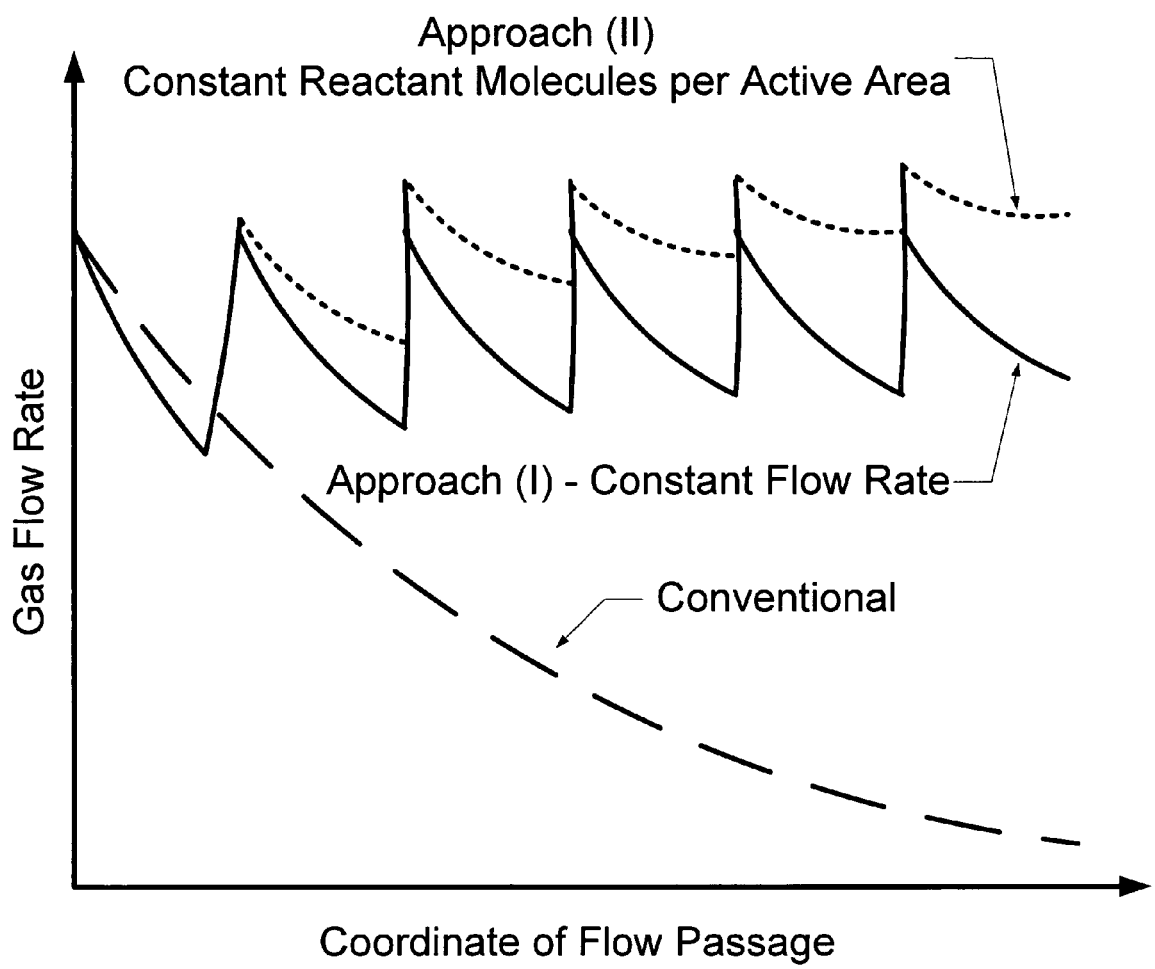
FIG. 12 a schematic diagram comparing variations in the reacting gas flow rate along the coordinate of the flow channel between conventional designs and the two approaches of the present invention.
Figure 13:
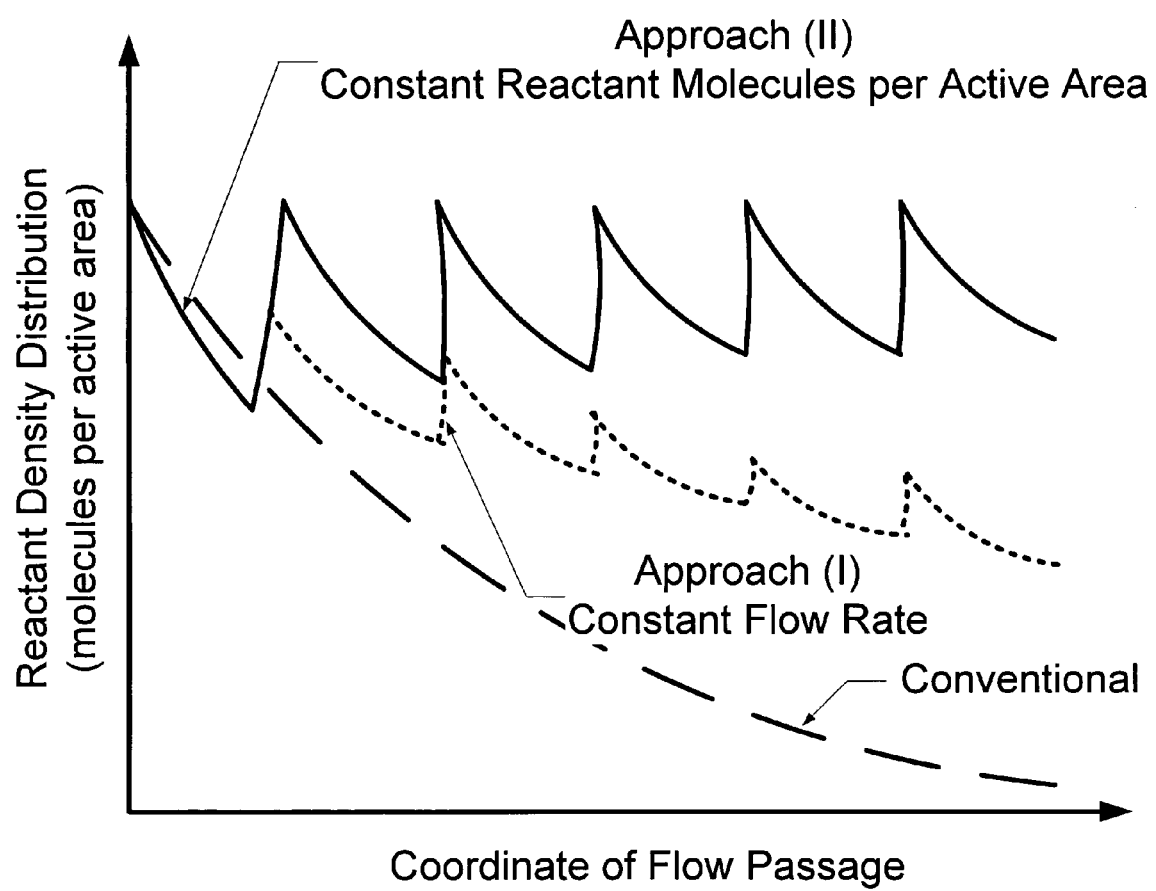
FIG. 13 is a schematic diagram comparing variations in reactant molar density distribution along the coordinate of the flow channel between conventional designs and the two approaches of the present invention.
Figure 14:
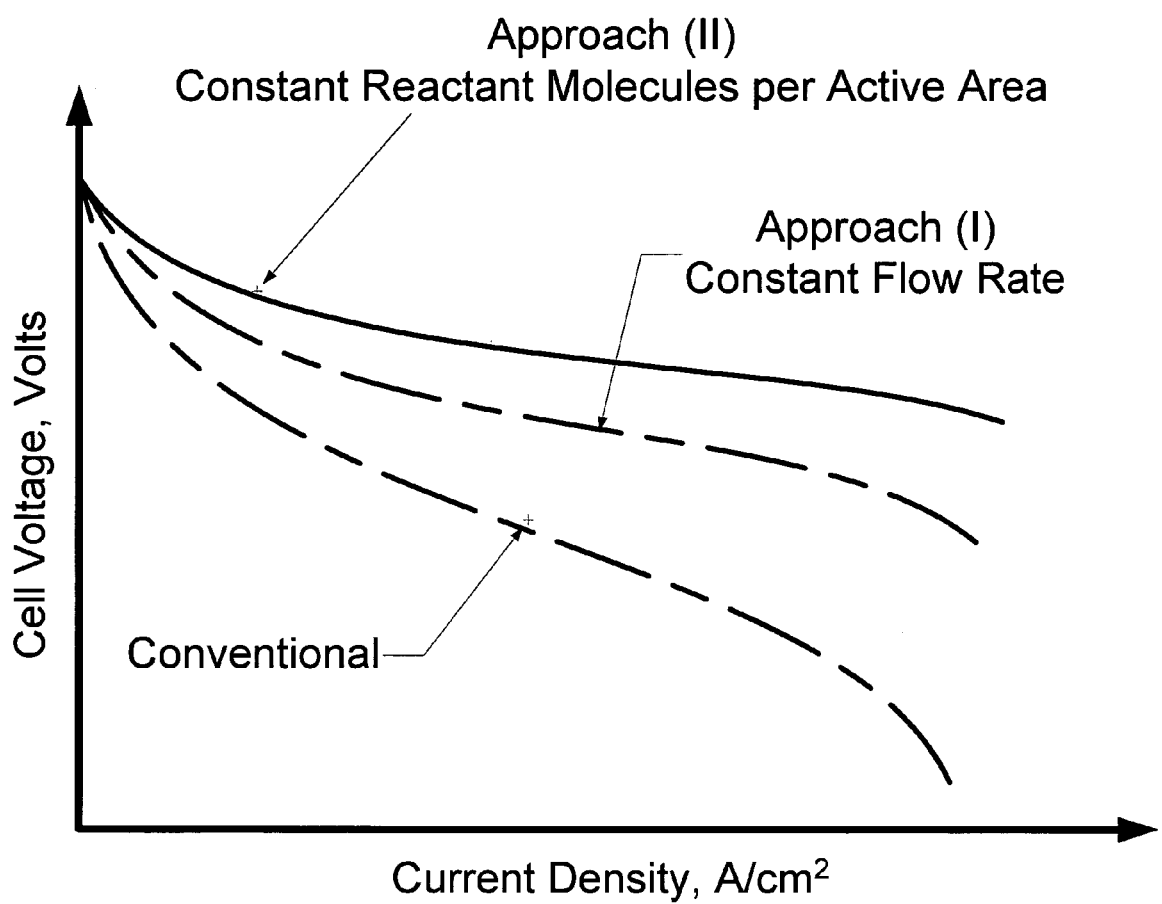
FIG. 14 is a schematic diagram comparing variations in cell voltage against current density between conventional designs and the two approaches of the present invention.

FIGS. 12 to 14 illustrate the difference in distributions of gas flow rate and molecules per active area as well as the cell performance between the designs of conventional, and the approaches I and II according to the present invention. With the conventional flow field, both the gas flow rate and the reactant molecules per active area monotonically decrease along the coordinate of the flow passage, which leads to poor water removal and lower current density. With the approaches I and II, both the gas flow rate and the reactant molecules per active area will decline within the same flow passage, but they will be raised to the value at the inlet as a result of reduction in the flow area, which is then followed by a gradual decrease within the next passage. Because of the presence of inert gases in the reactant stream, the total gas utilization is generally lower than the reactant gas utilization, and thus the decrease rate in the number of flow channels is greater with the approach II (constant reactant molecules per active area) than with the approach I (constant gas flow rate). Therefore, while the gas flow rate will be nearly constant with the approach I, it will appear somewhat increasing along the flow passage. With respect to the reactant molecules per active area, approach I will be somewhat lower compared to approach II, even though they all are higher than the prior art conventional design. Constant and higher reactant molecules per active area as well as the benefits including increased gas diffusion and improved water removal as a result of increased gas flow rate and turbulence, the approach II will produce superior performance than the approach I, and the latter is certainly better than the conventional design, as shown in FIG. 14.

It is to be understood that the number of flow passages, the number of the grooves of the first passage, the positions of the manifold holes, and the orientation of the flow channels as well as the geometric shapes of the plates can be freely determined considering the system requirements and restrictions of each individual design.

In the set of embodiments described above, the flow channels on the anode plate and on the cathode plate will have identical dimensions and will be arranged to mate each other across the MEA (i.e. channel facing channel and land facing land). However, other arrangements are also possible and therefore such arrangements are considered to be within the scope of the present invention.

While in the preferred embodiment a Proton Exchange Membrane Fuel Cells (PEMFC) (conventional low temperatures and high temperatures) has been used, the method described above is also applicable to other types of fuel cells such as alkaline fuel cell (AFC), phosphoric acid fuel cell (PAFC) and molten carbonate fuel cell (MCFC), or wherever reactant distributions are required. The fluid flow field designs in this invention will be applicable for either anode or cathode side, as well as for the coolant side if desired.

It will be understood that numerous modifications thereto will appear to those skilled in the art. Accordingly, the above description and accompanying drawings should be taken as illustrative of the invention and not in a limiting sense. It will further be understood that it is intended to cover any variations, uses, or adaptations of the invention following, in general, the principles of the invention and including such departures from the present disclosure as come within known or customary practice within the art to which the invention pertains and as may be applied to the essential features herein before set forth, and as follows in the scope of the appended claims.

What is claimed is:

1. A flow field plate for a fuel cell stack, the flow field plate comprising:
   an inlet manifold;
   an outlet manifold; and
   a flow field communicating with said inlet manifold and said outlet manifold, the flow field comprising at least three passages, each one of said passages having grooves thereon, adjacent ones of said passages being interconnected by a header providing a substantially even redistribution of a fluid flow received from grooves of one passage to grooves of a next passage, a number of said grooves for each one of said passages decreasing from one of said passages to another from said inlet manifold to said outlet manifold, said decreasing following an exponential rule in order to maintain substantially constant one of a flow rate and a concentration of reactant molecules per active area of a membrane in said grooves across said flow field.

2. The flow field as claimed in claim 1, wherein said flow field plate is an anode flow field plate.

3. The flow field plate as claimed in claim 1, wherein said flow field plate is a cathode flow field plate.

4. The flow field plate as claimed in claim 1, wherein said grooves of each one of said at least three passages are parallel.

5. The flow field plate as claimed in claim 4, wherein said grooves of each one of said at least three passages have constant cross-section dimensions, said header acting as a manifold interconnecting many grooves of an upstream passage to many grooves of a downstream passage, a ratio in a number of grooves in interconnected passages being less than 2:1.

6. The flow field plate as claimed in claim 1, wherein said header is positioned at an angle so that a reactant fluid flowing in said flow field changes from a first direction of flow in said grooves of one passage, as it passes through said header, to a second direction of flow in said grooves of a next passage.

7. The flow field plate as claimed in claim 6, wherein said second direction of flow of said reactant fluid in said grooves of a next passage is at substantially 90° from said first direction of flow.

8. The flow field plate as claimed in claim 7, wherein said passages are interconnected to form a U-turn, said header being positioned at one corner of said U-turn and wherein said first direction of flow is a downward direction and said second direction of flow is an upward direction.

9. The flow field plate as claimed in claim 6, wherein said angle is given by $$\tan(\varphi) = \frac{n_i w_c + (n_i - 1) w_s}{n_{i-1} w_c + (n_{i-1} - 1) w_s},$$

wherein said angle is $\varphi$, n is a number of flow channels, $w_c$ is a width of a flow channel, $w_s$ is a width of a land, and i is a number identifying a passage.

10. The flow field plate as claimed in claim 1, wherein a desired reactant utilization is greater than 40%.

11. The flow field plate as claimed in claim 1, wherein said one of said flow rate and said concentration of reactant molecules per active area is substantially the same at entrances of said at least three passage of grooves.

12. The flow field plate as claimed in claim 1, wherein said one of said flow rate and said concentration of reactant molecules per active area of membrane in said grooves increases by less than 40% across each said header.

13. The flow field plate as claimed in claim 1, wherein said number of grooves is given by $$n_i = n_0 \exp\left[\frac{\ln(1 - \eta_0)}{N - 1}(i - 1)\right],$$

wherein $n_0$ is a number of grooves in a first one of said at least three passages, N is a total number of said at least three passages, $\eta_0$ is a fluid reactant utilization efficiency and i is a number identifying a passage.

14. The flow field plate as claimed in claim 1, wherein said number of grooves is given by $$n_i = n_0\left[1 - y_0\left(1 - \exp\left[\frac{\ln(1-\eta_0)}{N-1}(i-1)\right]\right)\right],$$

$n_0$ is a number of grooves in a first one of said at least three passages, $\gamma_0$ is a fluid reactant volumetric concentration, N is a total number of said at least three passages, $\eta_0$ is a fluid reactant utilization efficiency and i is a number identifying a passage.

* * * * *